(12) United States Patent
Kang (10) Patent No.: US 7,633,884 B2
(45) Date of Patent: Dec. 15, 2009

(54) ADDRESS ALLOCATION METHOD USING SITE-LOCAL PREFIX POOLS IN MOBILE AD-HOC NETWORKS

(75) Inventor: Kyung-Iim Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 690 days.

(21) Appl. No.: 10/963,658

(22) Filed: Oct. 14, 2004

(65) Prior Publication Data

US 2005/0083859 A1    Apr. 21, 2005

(30) Foreign Application Priority Data

Oct. 20, 2003    (KR) .................. 10-2003-0072966

(51) Int. Cl.
*H04L 12/28*    (2006.01)
*H04J 3/24*    (2006.01)

(52) U.S. Cl. ....................... 370/254; 370/475
(58) Field of Classification Search .............. None
See application file for complete search history.

(56) References Cited

U.S. PATENT DOCUMENTS

2004/0240474 A1* 12/2004 Fan .................. 370/475
2005/0117590 A1* 6/2005 Ronneke ............ 370/395.52
2005/0195773 A1* 9/2005 Popovich et al. ........... 370/338

OTHER PUBLICATIONS

Kilian Weniger, Martina Zitterbart, "IPv6 Autoconfiguration in Large Scale Mobile Ad-Hoc Networks", European Wireless 2002, vol. 1, Feb. 2002, pp. 142-148.*

Zhong Fan, "IPv6 Stateless Address Autoconfiguration in Ad Hoc Networks", M. Conti et al. (Eds.), Personal Wireless Communications (PWC 2003), IFIP-TC6 8th International Conference, Lecture Notes in Computer Science, vol. 2775, Springer-Verlag, Berlin, 2003, pp. 665-678.*

Jung Soo Park, Young Jin Kim, Sung Woo Park, "Stateless address autoconfiguration in Mobile Ad Hoc Networks using site-local address", draft-park-zeroconfig-manet-ipv6-00.txt, Jul. 2001, Entire document.*

(Continued)

*Primary Examiner*—Gregory B Sefcheck
*Assistant Examiner*—Suk Jin Kang
(74) *Attorney, Agent, or Firm*—Staas & Halsey LLP (57) ABSTRACT

An address allocation method using site-local prefix pools including (MANETs) generating link-local addresses by a plurality of nodes participating in a mobile ad-hoc network, and performing Duplicate Address Detection (DAD) to guarantee the uniqueness of the link-local addresses; electing a leader node of the plural nodes which notifies of a site-local prefix of the network; deciding whether networks adjacent to the network exist; generating a site-local prefix pool including plural site-local prefixes at random by the leader node if the neighboring networks do not exist; selecting one site-local prefix from the site-local prefix pool, and allocating a site-local prefix to the network; and notifying of the site-local prefix allocated by the leader node in order for each of the plural nodes to generate a site-local address. Accordingly, a site-local prefix pool is used to allocate duplication-free site-local prefixes to two or more MANETs, and as a result, duplication-free site-local addresses are allocated to nodes.

21 Claims, 5 Drawing Sheets

OTHER PUBLICATIONS

B. Haberman, J. Martin, "Automatic Prefix Delegation Protocol for Internet Protocol Version 6 (IPv6)", draft-haberman-ipngwg-auto-prefix-02.txt, Feb. 2002, Entire document.*

A. Misra, S. Das, A. McAuley, S.K. Das, "Autoconfiguration, registration, and mobility management for pervasive computing", IEEE Personal Communications, vol. 8, Issue 4, Aug. 2001, pp. 24-31.*

A. J. McAuley K. Manousakis, "Self-Configuring Networks", MILCOM 2000. 21st Century Military Communications Conference Proceedings, vol. 1, 2000 pp. 315-319.*

J. Jeong, J. Park, "Autoconfiguration Technologies for IPv6 Multicast Service in Mobile Ad-Hoc Networks", IEEE International Conference on Networks, 2002, pp. 262-264.*

A. Misra, S. Das, A. McAuley, "Autoconfiguration, Registration and Mobility Management for Pervasive Computing", IEEE Personal Communications, vol. 8, Issue 4, Aug. 2001.*

Jae-Hoon Jeong, et al., IPv6 Mobile Ad-hoc, "Autoconfiguration for Multicast Service in IPv6-based Mobile Ad-hoc Networks", Protocol Engineering Center, ETRI (pp. 67-70), Aug. 2002.

Eun-Sook So, et al., "Routing Optimization for a Mobile Node in Mobile IPv6", Dept. of Computer Science, Sookmyung Women's University (pp. 369-371), Oct. 2000.

Official Action issued by the Korean Intellectual Property Office on Aug. 26, 2005, in Korean Patent Application No. 2003-72966.

* cited by examiner

ADDRESS ALLOCATION METHOD USING SITE-LOCAL PREFIX POOLS IN MOBILE AD-HOC NETWORKS

CROSS-REFERENCE TO RELATED APPLICATIONS

This application claims benefit of Korean Patent Application No. 2003-72966, filed on Oct. 20, 2003 in the Korean Intellectual Property Office, the contents of which are incorporated herein in its entirety by reference.

BACKGROUND OF THE INVENTION

1. Field of the Invention

The present invention relates to an address allocation method using IP site-local prefix pools in mobile ad-hoc networks (MANETs), and more particularly, to a method of allocating duplication-free site-local prefixes to allocate addresses to nodes so that the allocated addresses can adapt to merging or partitioning of the MANETs.

2. Description of the Related Art

With the development of mobile communication devices and technologies, the necessity of small-sized wireless communication networks, in addition to the existing infrastructure network, is increased. In particular, more attention is focused on the small-scale wireless networks under environments which are liable to be isolated from the external Internet and where wired equipment is impractical such as in emergency situations, airplanes, inside of buildings, mountain regions, and so on. A mobile ad-hoc network (MANET) can be an example for such a small-scale wireless communication network.

Different from the infrastructure network, the MANET does not have an independent router receiving and forwarding packets, but has each mobile node serve as both a host and a router. Further, a node on the MANET can roam since it has a wireless communication device, so that the topology of the MANET is not fixed.

Since each node on the MANET has a limited transmission range on its wireless signals, packets may not be directly forwarded from a source node to a destination node. For such a case, packets are forwarded via a plurality of nodes serving as routers, which is referred to as a "multi-hop" mechanism, and the MANET needs a routing protocol to implement the multi-hop mechanism.

A uniqueness-guaranteed IP address has to be allocated to each node to route packets in the MANET. To do so, research is progressing to support the network environment for diverse mobile hosts to connect to the Internet in the MANET using the IPv6 address autoconfiguration, which is an Internet address scheme.

Different from past efforts in which research has focused on packet routing, research is actively progressing on network configuration and management in the MANET research field in recent. However, such research mainly relates to a scheme allocating duplication-free IP addresses, in consideration of network configuration and management, to mobile nodes attempting to take part in one MANET, and the Internet Engineering Task Force (IETF) MANET working group is centered on the active lines of research, but less attention is paid to research on an environment in which plural MANETs merge in a group.

A node attempting to participate in the MANET has to be allocated an address to be used in a corresponding MANET. To do this, the node generates a temporary address in a method such as address autoconfiguration, and performs Duplicate Address Detection (DAD) to confirm whether the generated address is a unique address in the corresponding MANET.

Figure 1:
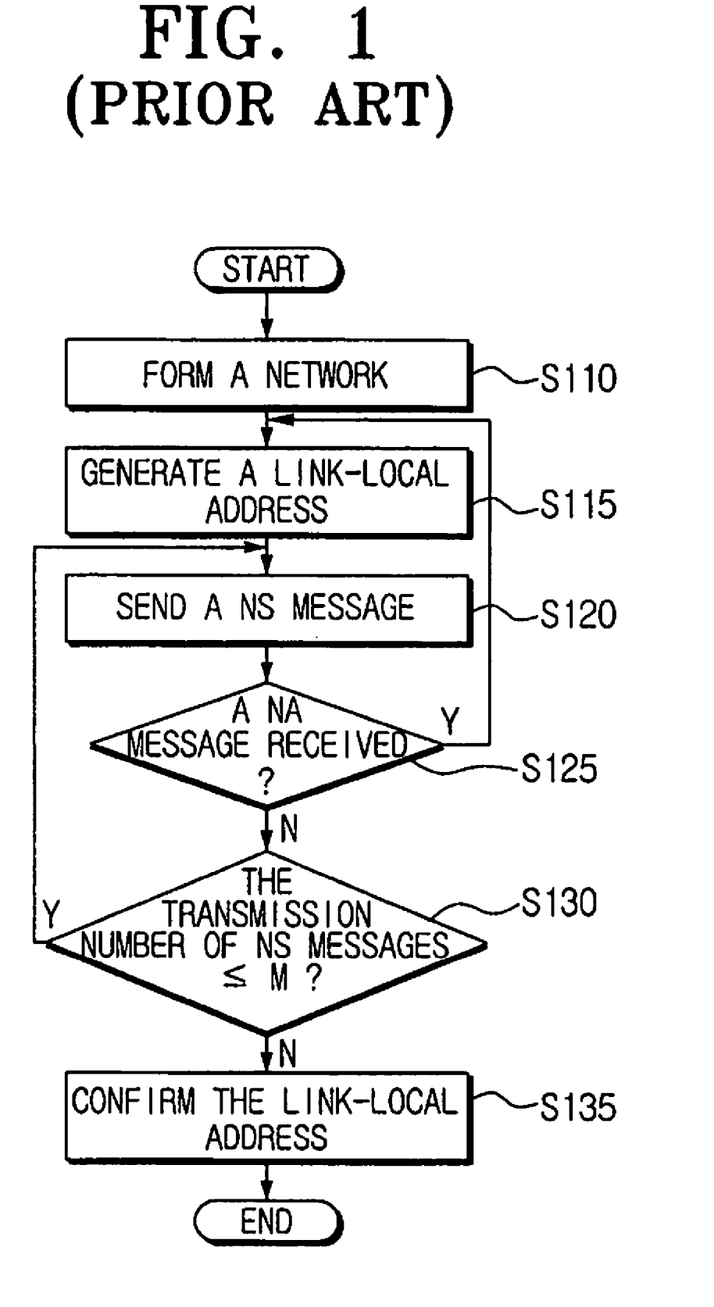
FIG. 1 is a flow chart showing a Duplicate Address Detection (DAD) process of a node in a conventional mobile ad-hoc network (MANET)

FIG. 1 is a flow chart showing a DAD process in a conventional mobile ad-hoc network. Referring to FIG. 1, if a network is formed with plural mobile nodes participating in operation S110, then each of the participated mobile nodes generates its own Link-Layer Address (LLA) in operation S115, and sends a Neighbor Solicitation (NS) message including the generated LLA to the entire network in operation S120 to start the DAD.

The mobile node decides whether to receive a Neighbor Advertisement (NA) message notifying of address duplication within a predetermined limited time RetransTimer in operation S125. If the mobile node fails to receive the NA message until the NS message has been resent as many times as the predetermined number of times in operation S130, the corresponding LLA is recognized as a unique address so that the LLA of the mobile node is confirmed in operation S135, and the mobile node performs communications using the LLA.

In the meantime, the topology of a MANET can vary all the time since nodes participating in the MANET have mobility as a characteristic, so the MANET can exist as one independent MANET, two or more independent MANETs can merge, or one independent MANET can be partitioned into two or more MANETs. However, the merging and partitioning of two or more mobile MANETs are not taken into consideration in the conventional method. Therefore, a method is needed which allocates uniqueness-guaranteed IP addresses in an environment taking the merging and partitioning into account.

The IP addresses are classed into a Link-local address, a site-local address, and global address based on a scope a corresponding address is applied to. The Link-local address is an address scoped to a corresponding link for communications with a neighboring node connected to the same link, and the site-local address is scoped to a corresponding local site. The global address has no limit to its scope.

Currently, one prefix is globally applied to all MANETs for a site-local prefix used upon generating an IPv6 site-local address for communications with outside networks in the MANET, or the site-local prefix is randomly selected for each MANET.

When the site-local prefix is globally used for all MANETs, the prefix is restricted in use. Further, it is impossible to allocate addresses in MANETs-clustered environments.

When each MANET randomly selects a site-local prefix, an additional DAD process among the networks is required to verify the uniqueness of the selected prefix since one network can not know the site-local prefix of the other network, which causes a waste of network resources. With the development of mobile communication devices and technologies, the necessity of small-sized wireless communication networks, in addition to the existing infrastructure network, is increasing. In particular, more attention is focused on the small-scale wireless networks under environments liable to isolate from external internet and wired equipment is impractical such as in emergency situations, airplanes, inside of buildings, mountain regions, and so on. A mobile ad-hoc network (MANET) is an example of such a small-scale wireless communication network.

SUMMARY OF THE INVENTION

An aspect of the present invention is to provide a method of allocating a duplication-free site-local prefix to each MANET to efficiently allocate addresses to mobile nodes so that the allocated addresses can adapt to merging and partitioning of a plurality of MANETs.

The foregoing and/or other aspects and advantages are substantially realized by providing an address allocation method using site-local prefix pools according to embodiments of the present invention including generating link-local addresses by plural nodes participating in a mobile ad-hoc network, and performing Duplicate Address Detection (DAD) to guarantee the uniqueness of the link-local addresses; electing a leader node of the plural nodes which notifies of a site-local prefix of the network; deciding whether networks adjacent to the network exist; generating a site-local prefix pool including plural site-local prefixes at random by the leader node if the neighboring networks do not exist; selecting one site-local prefix from the site-local prefix pool, and allocating a site-local prefix to the network; and notifying of the site-local prefix allocated by the leader node in order for each of the plural nodes to generate a site-local address.

In an aspect, the address allocation method further includes, acquiring by the leader node a site-local prefix pool including at least one site-local prefix from the neighboring networks, if the neighboring networks exist.

In an aspect, the address allocation method further includes, acquiring at least one site-local prefix from the neighboring networks and compensating the site-local prefix pool of the network, by the leader node of the network, if the number of site-local prefixes included in the site-local prefix pool of the network is less than a predetermined number.

According to an aspect, the leader node may decide whether the neighboring networks stay adjacent to the network every time a predetermined lifetime expires, and, if the neighboring networks are not adjacent, returns to the deciding whether the neighboring networks adjacent to the network exist.

According to the above and/or other aspects, an address allocation method using site-local prefix pools upon merging plural mobile ad-hoc networks each having a leader node notifying of a site-local prefix selected from a site-local prefix pool, according to the present invention, includes electing any of the leader nodes as a first leader node; taking, if first and second networks are adjacent to each other and the first network to which the first leader node belongs merges with the second network, a site-local prefix pool by the first leader node from a second leader node of the second network, and adding the taken site-local prefix pool to a site-local prefix pool of the first leader node; and notifying nodes of the second network of a site-local prefix by the first leader node, and re-generating site-local addresses by the nodes.

In an aspect, the address allocation method further includes sending to the first and second leader nodes the addresses of the nodes belonging to the first and second networks; comparing the sent node addresses by the first and second leader nodes, and deciding whether the same addresses exist; and re-generating, if the same addresses exist, corresponding node addresses.

In an aspect, the address allocation method further includes dropping the site-local prefix pool of the second leader node if the first and second networks are not adjacent to each other.

In an aspect, if the networks are not adjacent to each other and the networks merge, a leader node of any one of the networks which has more neighboring networks is elected as the first leader node.

According to an aspect, the address allocation method further includes, acquiring by a third leader node of the third network a site-local prefix pool from the site-local prefix pool of the second leader node if a third network adjacent to the second network exists.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
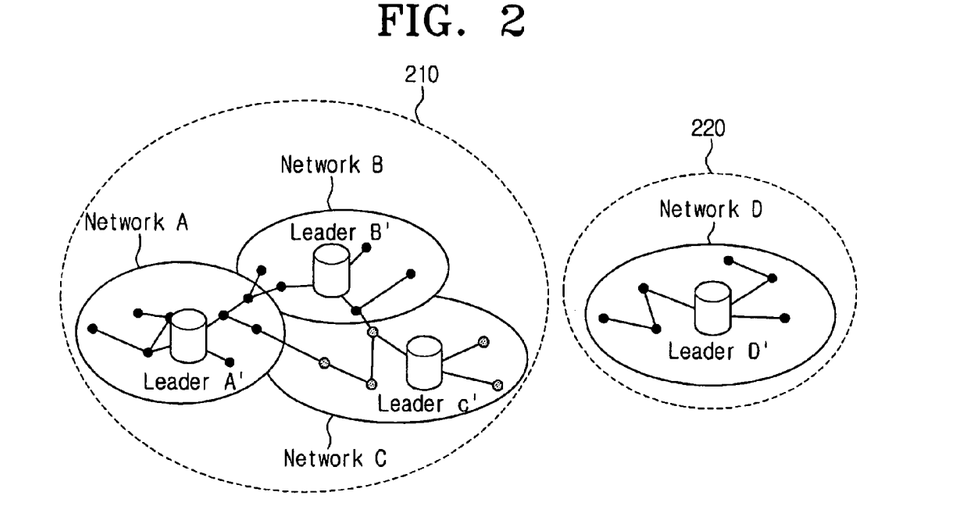
FIG. 2 is a view for illustrating MANETs having at least one sub-network to which an address allocation method is applied according to an embodiment of the present invention.

FIG. 2 is a view illustrating mobile ad-hoc networks (MANETs) having at least one sub-network to which an address allocation method is applied according to an embodiment of the present invention. FIG. 2 shows one independent first MANET 210 having three networks A, B, and C and a second MANET 220 having one network D.

The networks A, B, and C comprising the first MANET 210 are each a logical sub-network, and each sub-network has a certain scope of hop distance. For example, a sub-network can be formed with nodes having a certain hop distance from a center node of nodes having the same purpose. The second MANET 220 has one sub-network, D. The sub-networks A, B, C and D are collectively referred to as first to fourth networks for ease of reference.

The address allocation method using site-local prefix pools according to an embodiment of the present invention is applied to the first to fourth networks A, B, C, and D formed as described above. Each of the first to fourth networks A, B, C and D comprise a plurality of nodes. According to an embodiment of the present invention, each network A, B, C, and D floods a Router Advertisement (RA) message and elects first to fourth leader nodes A', B', C', and D', respectively, to notify the other nodes in the corresponding network of a site-local prefix. The elected leader nodes A', B', C', and D' each allocate a unique site-local prefix to the networks A, B, C, and D.

The process of allocating a unique site-local prefix to each leader node will be described in detail below. First, the process of allocating a site-local prefix in one independent MANET that is formed for the first time is described.

In the second MANET 220 having one sub-network D, the fourth leader node D' generates a certain site-local prefix pool at random, for example, by selecting one site-local prefix arbitrarily from the pool, and allocates the selected site-local prefix to the fourth leader node D.

If there exists a neighboring sub-network adjacent to the sub-network D, the sub-network D takes half of a site-local prefix pool of a leader node of the neighboring sub-network, and forms its own site-local prefix pool. Next, the site-local prefix allocation process in a MANET formed with a group of plural sub-networks will be described.

In the first MANET 210 in FIG. 2, with the first network A having been formed therein, the second leader node B' of the second network B takes a half of the site-local prefix pool that the first network A has, and allocates one of the site-local prefixes as the site-local prefix of the second network B.

Accordingly, the site-local prefix of the second network B is taken from the site-local prefix pool of the first network A, and this process makes the site-local prefix of the second network B different from the site-local prefix of the first network A, so that the uniqueness of the site-local prefix is guaranteed. Likewise, if a site-local prefix of the third network C is allocated in the same way, the uniqueness of a site-local prefix of each sub-network is guaranteed. The allocation process will be described in more detail below.

In the meantime, the first to third leader nodes A', B', and C' of the first to third networks A, B, and C adjacent and clustered to one another share information on other leader nodes such as site-local prefixes allocated to the respective leader nodes A', B', and C'.

Figure 3:
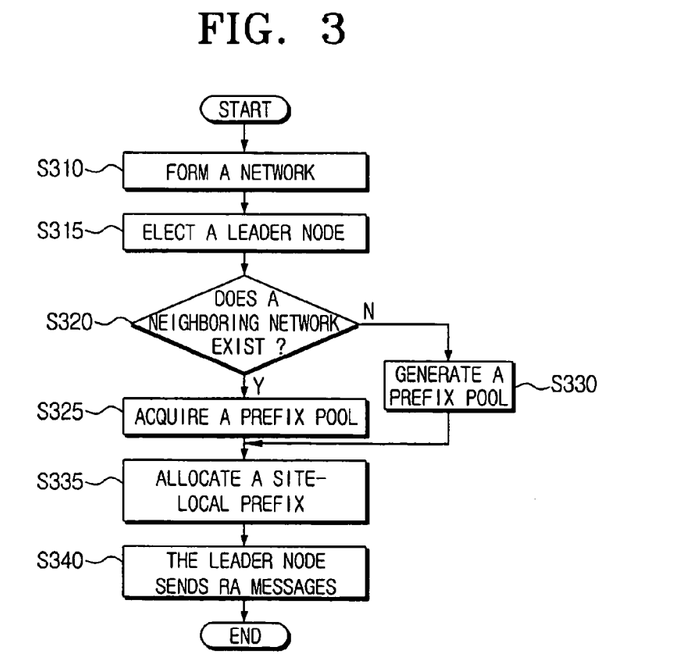
FIG. 3 is a flow chart showing an address allocation method according to an embodiment of the present invention.

FIG. 3 is a flow chart showing an address allocation method according to an embodiment of the present invention. If a MANET 210 is formed with logical sub-networks each having a certain scope or one independent MANET 220 in operation S310, the nodes participating in the corresponding sub-networks each generate a Link-local address and perform duplicate address detection (DAD) as described above with reference to FIG. 1 to guarantee the uniqueness of the generated address in the corresponding network. If the uniqueness of the Link-local address is confirmed through the DAD performance, the nodes of each sub-network each carry out a process to generate a site-local address.

In order to prevent a site-local prefix used to generate a site-local address from being duplicated among the nodes of the sub-networks, an address allocation method according to an embodiment of the present invention uses a site-local prefix pool.

Since the MANET does not have a fixed router, but has each node serve as both a host and a router, the MANET selects a leader node to manage a site-local prefix pool in operation S315. For example, the leader node A' in the first MANET 210 in FIG. 2 is selected to manage the site-local prefix pool. A method of selecting a leader node is a well-known method such as selecting a node nearest to the center of a network out of the group of nodes in the network, is one method selected as an appropriate node to serve as the leader node. However, there is no need to necessarily use the center node method for the present invention since other ways of designating a leader node may also be applied.

The selected leader node A' decides whether there exist networks adjacent to the first network A to which the leader node itself belongs in order to acquire a site-local prefix pool in operation S320. If a neighboring network exists, for example network B, the leader node takes a half of a site-local prefix pool that a leader node of the neighboring network (i.e., leader node B') has in operation S325. The selected leader node A' of the network A allocates one of the site-local prefixes to the leader node A' in operation S335.

However, if there does not exist a neighboring network, that is, if the network to which the leader node belongs exists independently (e.g., network D in the second MANET 220), the leader node D' generates a site-local prefix pool including a predetermined number of site-local prefixes at random within a scope defined in the IPv6 standard in operation S330. For example, the site-local prefix pool can include 30 site-local prefixes. The leader node allocates to itself one site-local prefix taken out of the generated site-local prefix pool in operation S335.

After the leader node allocates its own site-local prefix as stated above, the leader node sends to the other nodes of the network an RA message including its own site-local prefix in operation S340. If each of the other nodes in the network receives the RA message the leader node sends, and acquires the site-local prefix from the RA message, each node generates a site-local address based on the nodes corresponding Link-local address. The generated site-local address is a uniqueness-guaranteed address in a corresponding network obtained through the above DAD process, and, according to the above site-local prefix generation method. The site-local prefix allocated to the leader node is guaranteed unique compared to site-local prefixes of neighboring networks. Accordingly, a site-local address of each node that is generated using the uniqueness-guaranteed site-local prefix has guaranteed uniqueness in an environment in which plural networks are clustered.

Figure 4:
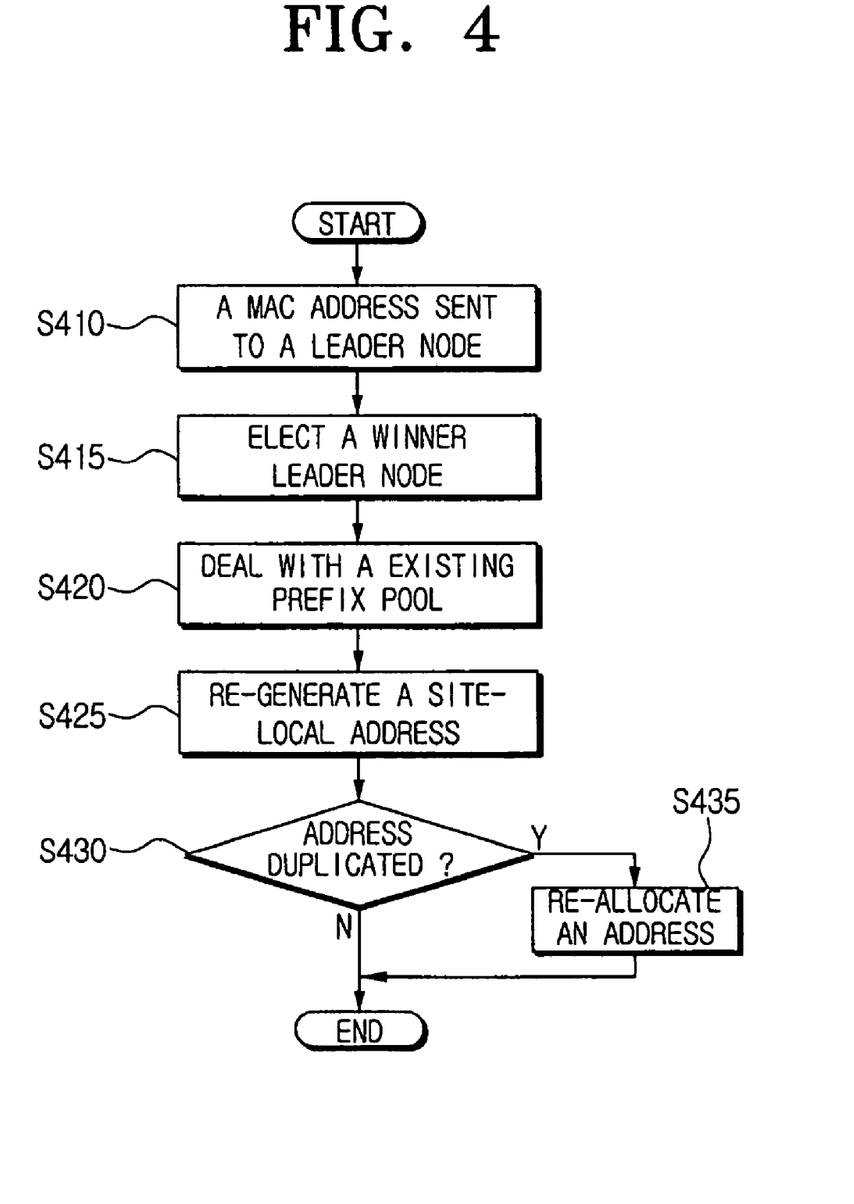
FIG. 4 is a flow chart showing an address allocation method upon merging networks according to an embodiment of the present invention.

FIG. 4 is a flow chart showing an address allocation method upon merging networks according to an embodiment of the present invention. The merging of networks refers to adding neighboring networks to form a new network or adding two different non-neighboring networks to form a new network due to roaming of the two different non-neighboring networks.

If two different networks merge, there must exist only one site-local prefix and only one site-local prefix pool after the merging. Therefore, one site-local prefix has to be selected, and then the existing site-local prefix pool has to be dealt with.

If two different networks start merging, all nodes in each network send their 48-bit media access control (MAC) addresses to the leader node of the network to which the nodes belong in order for the leader node to prepare a node information list from the MAC addresses of all the nodes and store the node information list in operation S410

Any of the leader nodes of the two networks is elected a winner leader node in operation S415. The winner leader node is elected based on a well-known leader election rule in cases where neighboring networks merge.

In the meantime, if the networks merge due to roaming, and the two networks are not allocated a site-local prefix from the site-local prefix pool according to embodiments of the present invention, then the site-local prefix can be duplicated. In this aspect, one of the two leader nodes that has more networks adjacent to the network to which it belongs is elected the winner leader node.

After the winner leader node is elected, the winner leader node deals with the existing site-local prefix pool in operation S420 so that the site-local prefix of the winner leader node is not a duplicate. When the neighboring networks merge, the leader node that is not elected as the winner leader node gives its own site-local prefix pool to the winner leader node, and, when the merging occurs due to roaming, the leader node that is not elected drops its own site-local prefix pool. When the winner leader node takes over the site-local prefix pool of the non-elected leader node, the winner leader node adds the site-local prefix pool of the non-elected leader node to the site local prefix pool of the winner leader node.

In the meantime, each node of a network to which the leader node, which is not the winner leader node, belongs re-generates site-local addresses using a site-local prefix received from the winner leader node in operation S425. Further, if there exist neighboring networks adjacent to the network to which the leader node that is not a winner leader node belongs, the leader node of each neighboring network takes a site-local prefix pool from the winner leader node, and allocates a leader node of the corresponding neighboring network a site-local prefix from the site-local prefix pool. Accordingly, site-local addresses are also re-generated to nodes belonging to each neighboring network.

If two networks merge, the two networks will then have the same prefix, which can cause nodes belonging to the merged network to have duplicate addresses. Therefore, when the two networks merge, the leader nodes of the respective networks compare node information lists maintained by each of the leader nodes and decide whether there exist the same addresses in operation S430. If duplicate addresses are discovered, node addresses are re-generated at random in operation S435. Therefore, each node does not have to independently carry out DAD in order to guarantee the uniqueness of addresses.

Hereinafter, descriptions will be made of an address allocation method that is performed upon partitioning one network into two networks. When a network is partitioned into two networks and the two networks become neighbors to each other, one of the two networks that does not have a leader node elects a new leader node, and the new leader node takes a site-local prefix from the other of the two networks that has the leader node, and then allocates a unique site-local prefix to itself. However, when the two partitioned networks do not become neighbors to each other, the one network in which a leader node does not exist elects a new leader node, and the new leader node generates a new site-local prefix pool. If the two partitioned networks become a neighbor with a third network other than the partitioned networks themselves, the new leader node takes a site-local prefix pool from the neighboring network and allocates a site-local prefix to itself.

Figure 5A:
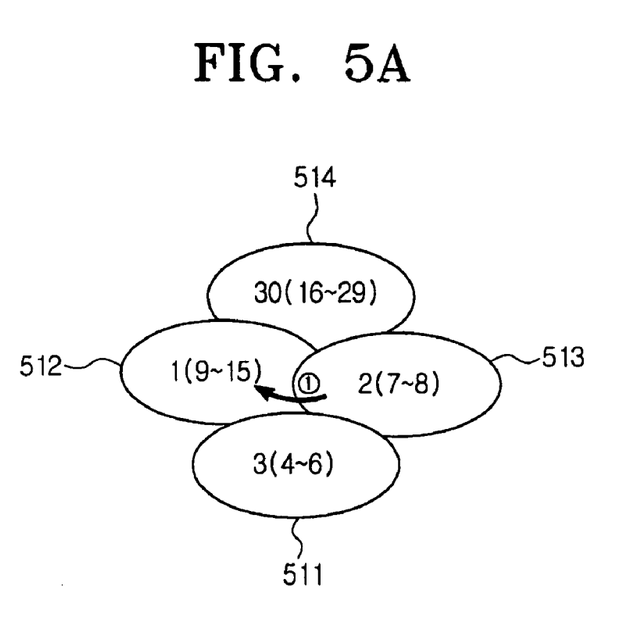
FIG. 5A and FIG. 5B are views explaining a prefix pool management method according to an embodiment of the present invention.
Figure 5B:
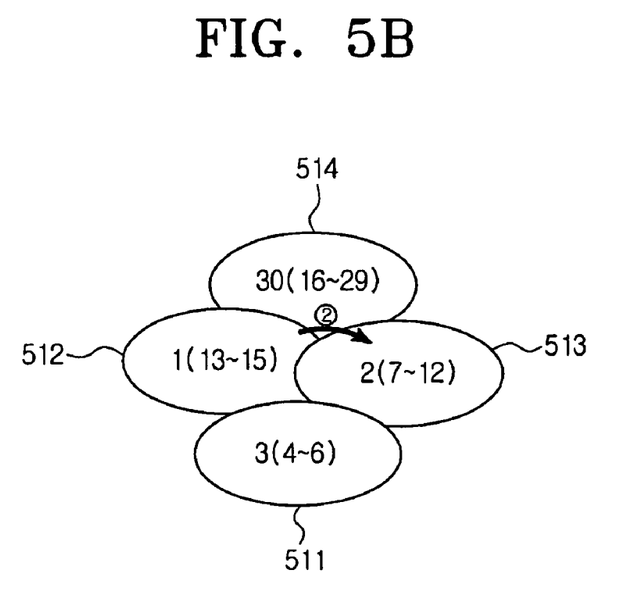

FIG. 5A and FIG. 5B are views explaining a prefix pool management method according to an embodiment of the present invention. Based on the IPv6 standard, 65535 site-local prefixes can be allocated to a network, which is enough to be used by a plurality of MANETs in an environment in which the MANETs are clustered. However, since site-local prefixes are partially taken from limited site-local prefix pools of neighboring networks in network creation order, a method of preventing the site-local prefix pools from being emptied through such a series of procedures and complementing site-local prefix pools in order to correct the imbalance of the site-local prefix pools which can occur among plural networks is required.

Thus, in an aspect, a site-local prefix pool of an individual network is partitioned, and a portion of the partitioned site-local prefix pool is allocated to a different network. If the number of site-local prefix pools of the corresponding network becomes smaller than a threshold value, the site-local prefixes of a preceding network formed earlier than the corresponding network, that is, the site-local prefixes of the preceding network, which has allocated the site-local prefix pool to the corresponding network, are partitioned and re-allocated to the corresponding network when the corresponding network is formed.

Referring to FIG. 5A, first to fourth networks 511, 512, 513, and 514, respectively, are, adjacent to each other to be clustered. Looking at network 514 for the sake of explanation, 30(16~29) in the network 514 identifies the site-local prefix allocated to the network 514 and the site-local prefixes included in the site-local prefix pool of the network 514. Here 30 represents the site-local prefix taken out of the prefix pool of the network 514 and allocated to the network 514. The site-local prefix pool numbers remaining in the prefix pool of the network 514 after the allocation of 30 are represented by 16~29. The site-local prefix pool of the third network 513 has two prefixes 7 and 8 (i.e., 2(7~8)). For example, if a threshold value is set to 2, the number of the site-local prefixes existing in the site-local prefix pool of the third network 513 is less than the threshold value, so that the third network 513 requests the second network 512, which allocated the site-local prefixes when the third network 513 was formed, to partition the site-local prefix pool and allocate site-local prefixes again.

Referring to FIG. 5B, the second network 512, requested by the third network 513 to partition and allocate the site-local prefix pool, partitions the second network's site-local prefix pool 9~15 and allocates a portion of the site-local prefixes to the third network 513. In the present embodiment, the second network 512 allocates site-local prefixes 9, 10, 11, and 12 to the third network 513 from its own site-local prefix pool, which causes the site-local prefix pool of the third network 513 to have six site-local prefixes 7, 8, 9, 10, 11, and 12, resulting in a number of site-local prefixes exceeding the threshold value.

Accordingly, the site-local prefix pools are appropriately managed so that the number of the site-local prefix pools of each network exceeds a predetermined threshold value.

Figure 6:
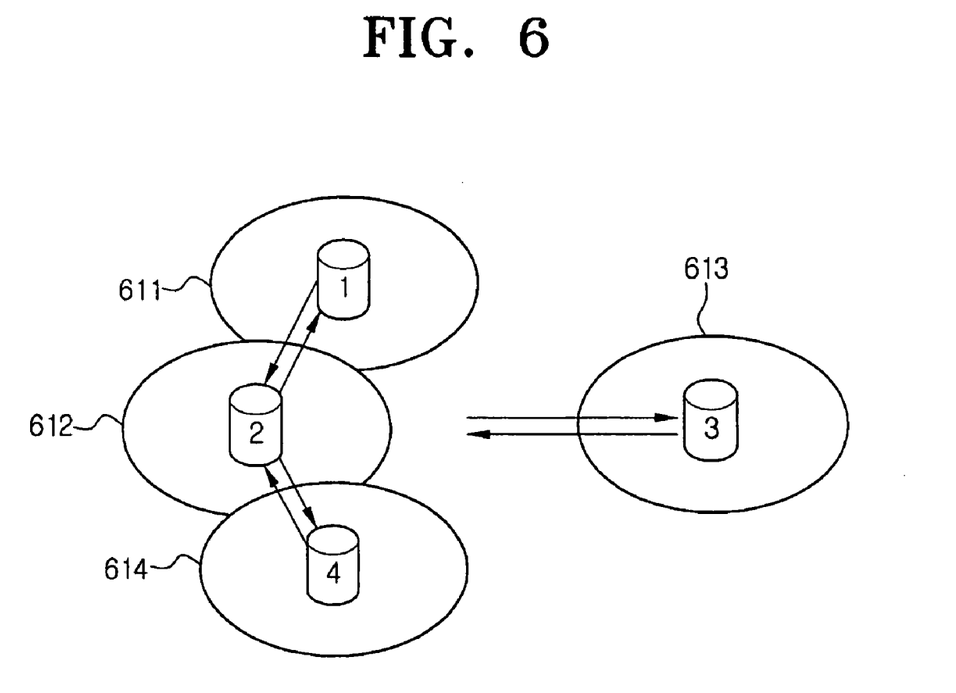
FIG. 6 is a view explaining a prefix pool management method for mobile networks according to an embodiment of the present invention.

FIG. 6 is a view explaining a prefix pool management method for mobile networks according to an embodiment of the present invention. Referring to FIG. 6, under the environment in which first to fourth networks 611, 612, 613, and 614, respectively, each having a certain scope are clustered to form one MANET, the third network 613 frequently partitions from or merges into the clustered networks due to its movements.

If a site-local prefix pool is allocated over and over every time the third network 613 moves in and out of the cluster in order to repeatedly partition from and merge into the clustered first, second, and fourth networks 611, 612, and 614, the site-local prefix pools of the first, second, and fourth networks 611, 612, and 614 may become emptied. Therefore, if the third network 613 partitions from and merges again into the clustered first, second, and fourth networks 611, 612, and 614 within a predetermined time, the site-local prefix pool allocated before the partition is kept unchanged.

In the meantime, as long as the first to fourth networks 611, 612, 613, and 614 are not partitioned from a preceding network which has allocated site-local prefix pools to the four networks, the first to fourth networks 611, 612, 613, and 614 periodically update the allocated site-local prefixes during a set period of time referred to as a lifetime, confirm connection states among the networks, and confirm neighboring networks. Therefore, if the third network 613 partitions from and merges again into the clustered first, second, and fourth networks 611, 612, and 614 within the lifetime, the third network 613 is not allocated a new site-local prefix pool.

However, if the lifetime expires in the partitioned state, the third network 613 generates a new site-local prefix pool, and the addresses of the nodes belonging to the third network 613 have to be established again. Accordingly, after the lifetime expires in the partitioned state, the third network 613 has to be allocated a site-local prefix pool again from its prospective neighboring network even though the third network 613 merges again into the clustered first, second, and fourth networks 611, 612, and 614.

Aspects of the present invention may be accomplished by a method, an apparatus, a system and the like. If performed by software, the method of the present invention is necessarily implemented in code segments executing a necessary operation. Programs or code segments may be stored in a processor-readable medium, or may be sent by a computer data signal combined with a carrier wave via a transferring medium or communication network. The processor-readable medium includes any computer readable recording medium or transmission medium capable of storing or sending information. Examples of the computer-readable medium are an electronic circuit, a semiconductor memory device, a ROM, a flash memory, an erasable ROM, a floppy disk, an optical disk, and a hard disk. Examples of the transmission medium include an optical fiber medium, a radio frequency (RF) network, and the like. The computer data signal includes any signal, which can be transmitted through transmission medium, such as an electronic network channel, an optical fiber, air, an electromagnetic field, an RF network, and the like.

According to an embodiment of the present invention, a unique site-local prefix pool is allocated to each network in a MANET environment in which two or more networks are clustered, so that the uniqueness of site-local addresses is guaranteed in a MANET environment.

A site-local prefix pool is used to allocate duplication-free site-local prefixes to two or more MANETs, so that the duplication-free site-local addresses can be allocated to nodes and adaptively allocated to the merging and partitioning of networks.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An address allocation method using site-local prefix pools, comprising:
    generating link-local addresses by a plurality of nodes participating in a network, and performing Duplicate Address Detection (DAD) to guarantee the uniqueness of the link-local addresses;
    electing a leader node of the plurality of nodes which notifies the remaining plurality of nodes of a site-local prefix of the network;
    deciding whether neighboring networks adjacent to the network exist;
    generating a site-local prefix pool comprising a plurality of site-local prefixes at random if the neighboring networks do not exist;
    selecting one site-local prefix from the site-local prefix pool, and allocating the one site-local prefix to the network; and
    notifying the remaining plurality of nodes of the one site-local prefix allocated by the leader node in order for each of the remaining plurality of plural nodes to generate a site-local address, and
    further comprising when the neighboring networks exist, acquiring by the leader node a second site-local prefix pool including at least one site-local prefix from the neighboring networks,
    the network being a mobile ad-hoc network.

2. The address allocation method as claimed in claim 1, further comprising if a number of site-local prefixes included in the neighboring site-local prefix pool of the network is less than a predetermined number, acquiring at least one additional site-local prefix from the neighboring networks to add to the second site-local prefix pool of the network, by the leader node of the network.

3. The address allocation method as claimed in claim 1, wherein the leader node decides whether the neighboring networks stay adjacent to the network every time a predetermined lifetime expires, and, if the neighboring networks did not stay adjacent to the leader node, the leader node checks whether the neighboring networks adjacent to the network exist.

4. The address allocation method as claimed in claim 1, wherein the network is a merged network.

5. An address allocation method using site-local prefix pools upon merging a plurality of mobile ad-hoc networks each having a leader node and a plurality of other nodes, the leader node notifying of a site-local prefix selected from a site-local prefix pool, comprising:
    electing, by one of the plurality of other nodes, any of the leader nodes of the plurality of mobile ad-hoc networks as a first leader node;
    taking, if a first and second network of the plurality of mobile ad-hoc networks are adjacent to each other and the first network to which a first one of the leader nodes belongs merges with the second network, a second site-local prefix pool from a second leader node of the second network, and adding the taken second site-local prefix pool to a first site-local prefix pool of the first leader node; and
    notifying nodes of the second network of the first site-local prefix pool of the first leader node, and generating site-local addresses for each of the nodes of the plurality of mobile ad-hoc networks.

6. The address allocation method as claimed in claim 5, further comprising:
    sending to the first and second leader nodes the site-local addresses of the nodes belonging to the first and second networks, respectively;
    comparing the sent node site-local addresses by each of the first and second leader nodes, and deciding whether same addresses exist; and
    re-generating, if the same addresses exist, corresponding node site-local addresses at random.

7. The address allocation method as claimed in claim 5, further comprising dropping the site-local prefix pool of the second leader node, if the first and second networks are not adjacent to each other.

8. The address allocation method as claimed in claim 5, wherein, if the first and second networks are not adjacent to each other and the first and second networks merge, the electing comprises electing as the first leader node of any one of the first and second networks which has more neighboring networks.

9. The address allocation method as claimed in claim 5, further comprising acquiring by a third leader node of a third network of the plurality of mobile ad-hoc networks a third site-local prefix pool from the second site-local prefix pool, if the third network adjacent to the second network exists.

10. A method of allocating addresses in a mobile ad-hoc network (MANET) comprising a first network comprising a plurality of nodes, comprising:
generating, by one of the plurality of nodes, a site-local prefix pool comprising a plurality of site-local prefixes;
selecting one of the site-local prefixes from the site-local prefix pool;
allocating the selected site-local prefix to one of the nodes in the first network of the MANET;
transmitting the allocated site-local prefix to remaining nodes of the first network of the MANET;
determining if a second network near the first network is within a range of the first network;
identifying a second leader node comprising a second site-local prefix pool of the second network when the second network is within the range; and
allocating a portion of the second site-local prefix pool to the first network.

11. The method of claim 10, wherein the allocating comprises:
identifying a leader node in the first network; and
allocating the selected site-local prefix to the leader node.

12. The method of claim 10, wherein the transmitting of the allocated site-local prefix comprises transmitting a router advertisement message.

13. The method of claim 10, wherein the allocating the portion comprises allocating one half of the second site-local prefix pool to the first site-local prefix pool.

14. The method of claim 10, wherein the allocating the portion comprises deleting the first site-local prefix pool by the allocating the portion of the second site-local prefix pool to the first network.

15. The method of claim 14, further comprising:
generating site local addresses for each node of the first network according to the allocated site-local prefix.

16. The method of claim 10, wherein the allocated portion of the second site-local prefix pool is added to the allocated first site-local prefix pool.

17. The method of claim 10, further comprising:
increasing the portion of the second site-local prefix pool allocated to the first network when a number of the site-local prefixes is below a threshold number.

18. A method of allocating unique addresses in a mobile ad hoc network (MANET), comprising:
generating, by one of a plurality of nodes, a site-local prefix pool comprising a plurality of site-local prefixes for a first network in the MANET;
allocating a portion of the site-local prefix pool to a second network which merges with the MANET;
allocating a first site-local prefix from a remaining portion of the site-local prefix pool to the first network;
allocating a second site-local prefix from the allocated portion of the site-local prefix pool to the second network;
generating site local addresses for nodes of the first network according to the first site-local prefix; and
generating site local addresses for nodes of the second network according to the second site-local prefix.

19. The method of claim 18, further comprising:
allocating a third portion of one of the remaining portion of the site-local prefix pool from the first network and the allocated portion of the site-local prefix pool from the second network to a third network which merges with the first and second networks in the MANET.

20. The method of claim 19, wherein when the third network leaves the MANET and merges a second time with the first and second networks of the MANET, if the merging for the second time occurs within a predetermined lifetime then the allocated third portion is maintained by the third network, and if the merging for the second time occurs after the predetermined lifetime then the method further comprises allocating a fourth portion of one of the remaining portion of the site-local prefix pool from the first network and the allocated portion of the site-local prefix pool from the second network to the third network.

21. The method of claim 19, further comprising:
increasing a size of the third portion allocated to the third network when a number of the site-local prefixes in the third portion is below a threshold number.

* * * * *

UNITED STATES PATENT AND TRADEMARK OFFICE
CERTIFICATE OF CORRECTION

| | | |
|---|---|---|
| PATENT NO. | : 7,633,884 B2 | Page 1 of 1 |
| APPLICATION NO. | : 10/963658 | |
| DATED | : December 15, 2009 | |
| INVENTOR(S) | : Kyung-lim Kang | |

It is certified that error appears in the above-identified patent and that said Letters Patent is hereby corrected as shown below:

Column 11, Line 37, change "site local" to --site-local--.

Column 12, Lines 5-6, change "ad hoc" to --ad-hoc--.

Column 12, Line 17, change "site local" to --site-local--.

Column 12, Line 19, change "site local" to --site-local--.

Column 12, Line 29, change "MAN ET," to --MANET,--.

Signed and Sealed this

Sixteenth Day of March, 2010

David J. Kappos
*Director of the United States Patent and Trademark Office*